US012690027B2

(12) United States Patent
Henry et al.

(10) Patent No.: US 12,690,027 B2
(45) Date of Patent: Jul. 21, 2026

(54) COMPACT MULTI-USER MIMO SCHEDULING METHOD

(71) Applicant: Cisco Technology, Inc., San Jose, CA (US)

(72) Inventors: Jerome Henry, Pittsboro, NC (US); Pascal Thubert, Roquefort les Pins (FR); Juan Carlos Zuniga, Montreal (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 474 days.

(21) Appl. No.: 18/181,844

(22) Filed: Mar. 10, 2023

(65) Prior Publication Data

US 2024/0306144 A1 Sep. 12, 2024

(51) Int. Cl.
| | |
|---|---|
| *H04W 72/1263* | (2023.01) |
| *H04L 1/08* | (2006.01) |
| *H04W 28/02* | (2009.01) |
| *H04B 7/0452* | (2017.01) |

(52) U.S. Cl.
CPC ........... *H04W 72/1263* (2013.01); *H04L 1/08* (2013.01); *H04W 28/0278* (2013.01); *H04B 7/0452* (2013.01)

(58) Field of Classification Search
CPC ..... H04B 7/0452; H04L 1/08; H04L 27/2602; H04W 28/0278; H04W 56/003; H04W 56/0015; H04W 72/1263; H04W 74/006; H04W 74/06; H04W 84/12; H04W 74/0808
USPC ........................................ 370/312, 329, 445
See application file for complete search history.

(56) References Cited

U.S. PATENT DOCUMENTS

| | | | |
|---|---|---|---|
| 2014/0226506 A1 | 8/2014 | Sadek | |
| 2016/0227533 A1* | 8/2016 | Josiam | H04W 74/006 |
| 2017/0086212 A1* | 3/2017 | Kim | H04L 27/2602 |
| 2017/0208625 A1* | 7/2017 | Choi | H04W 74/006 |

(Continued)

FOREIGN PATENT DOCUMENTS

WO WO-2018182688 A1 * 10/2018 ............ H04W 56/03

OTHER PUBLICATIONS

Ahn W (Yonsei Univ), et al., "Regarding Buffer Status of UL-STAs in UL-OFDMA", IEEE draft, 11-15-0881-01-00AX-REGARDING-BUFFER-STATUS-OF-UL-STAS-IN-UL-OFDMA, IEEE-SA MENTOR, Piscataway, NJ USA, doc.: IEEE 802.11-15/0881r1, vol. 802.11ax, No. 1, Jul. 14, 2015, pp. 1-16, XP068157904, retrieved from https://mentor.ieee.org/802.11/dcn/15/11-15-0881-01-00ax-regarding-buffer-status-of-ul-stas-in-ul-ofdma.pptx on Jul. 14, 2015, p. 7, p. 11-p. 12.

(Continued)

*Primary Examiner* — Harun Chowdhury
(74) *Attorney, Agent, or Firm* — Edell, Shapiro & Finnan, LLC

(57) ABSTRACT

A method comprises: at an access point configured to communicate wirelessly with wireless stations: transmitting, to the wireless stations, a first multi-user trigger frame that identifies the wireless stations and allocates, to the wireless stations, resource units in which the wireless stations are to transmit data; and responsive to transmitting the first multi-user trigger frame, receiving, from the wireless stations, an uplink multi-user data frame that includes uplink data segments concurrently transmitted in the resource units by at least some of the wireless stations.

20 Claims, 7 Drawing Sheets

(56) References Cited

U.S. PATENT DOCUMENTS

| | | |
|---|---|---|
| 2019/0327749 A1 | 10/2019 | Kim et al. |
| 2020/0137727 A1 | 4/2020 | Min et al. |
| 2021/0045134 A1 | 2/2021 | Zhou et al. |
| 2021/0099206 A1 | 4/2021 | Hedayat |
| 2021/0266966 A1 | 8/2021 | Baron et al. |
| 2022/0110154 A1 | 4/2022 | Lou et al. |

OTHER PUBLICATIONS

International Search Report and Written Opinion for International Application No. PCT/US2024/018304, mailed Jun. 6, 2024, 16 Pages.
Bellalta, B., et al., "AP-initiated Multi-User Transmissions in IEEE 802.11ax WLANs," https://arxiv.org/pdf/1702.05397v2.pdf, Jun. 5, 2018, 31 pages.

* cited by examiner

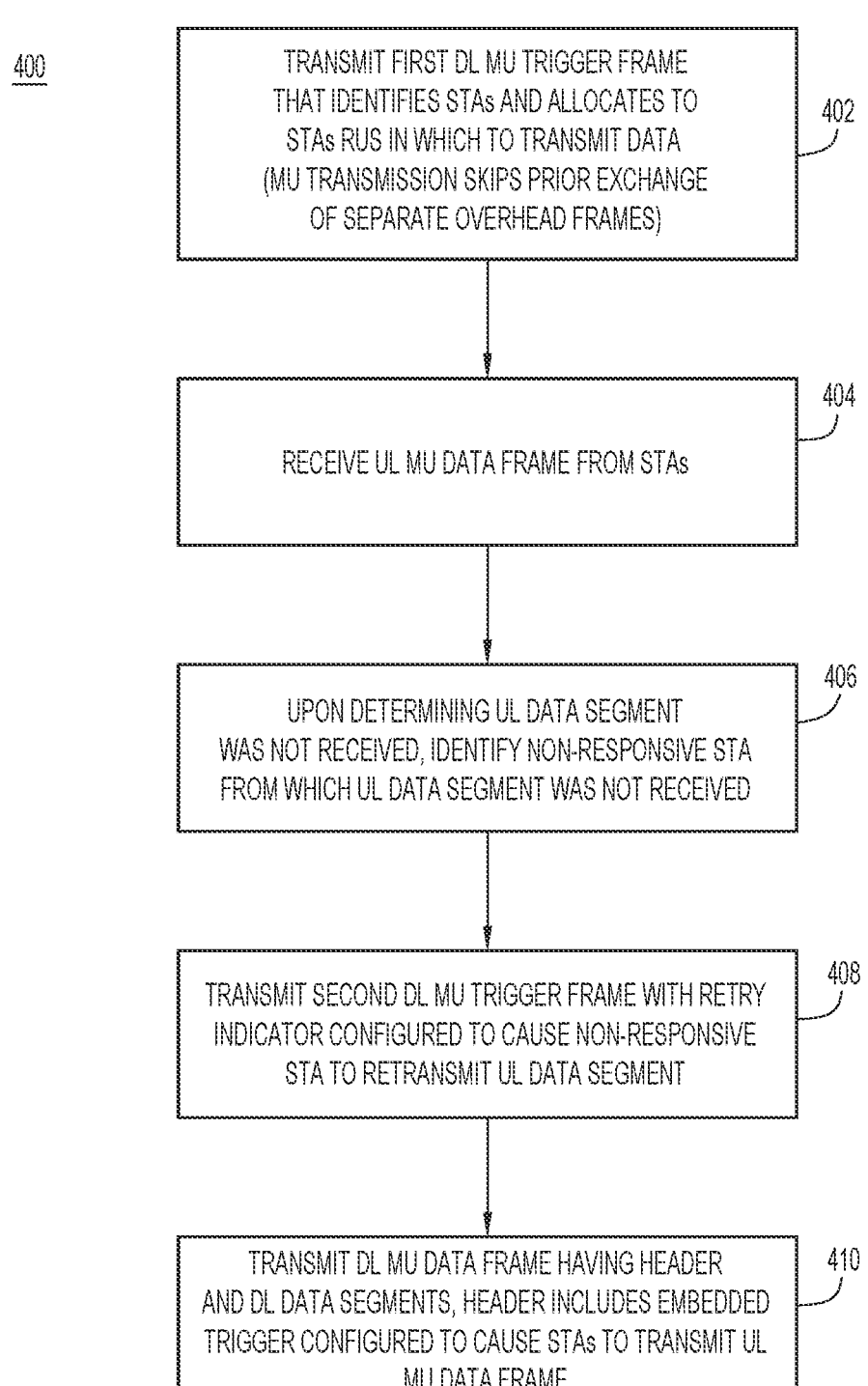

400

TRANSMIT FIRST DL MU TRIGGER FRAME
THAT IDENTIFIES STAs AND ALLOCATES TO
STAs RUS IN WHICH TO TRANSMIT DATA
(MU TRANSMISSION SKIPS PRIOR EXCHANGE
OF SEPARATE OVERHEAD FRAMES)

402

RECEIVE UL MU DATA FRAME FROM STAs

404

UPON DETERMINING UL DATA SEGMENT
WAS NOT RECEIVED, IDENTIFY NON-RESPONSIVE STA
FROM WHICH UL DATA SEGMENT WAS NOT RECEIVED

406

TRANSMIT SECOND DL MU TRIGGER FRAME WITH RETRY
INDICATOR CONFIGURED TO CAUSE NON-RESPONSIVE
STA TO RETRANSMIT UL DATA SEGMENT

408

TRANSMIT DL MU DATA FRAME HAVING HEADER
AND DL DATA SEGMENTS, HEADER INCLUDES EMBEDDED
TRIGGER CONFIGURED TO CAUSE STAs TO TRANSMIT UL
MU DATA FRAME

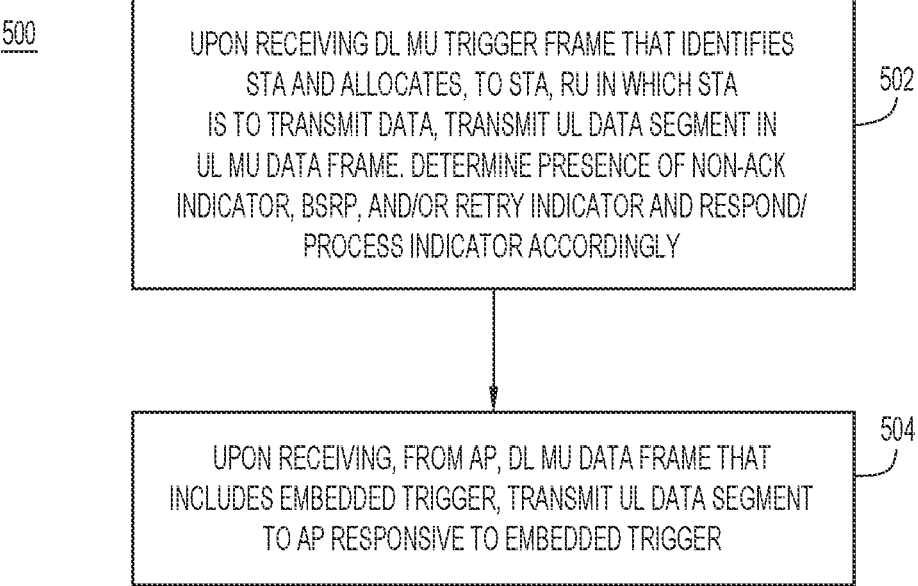

500

UPON RECEIVING DL MU TRIGGER FRAME THAT IDENTIFIES
STA AND ALLOCATES, TO STA, RU IN WHICH STA
IS TO TRANSMIT DATA, TRANSMIT UL DATA SEGMENT IN
UL MU DATA FRAME. DETERMINE PRESENCE OF NON-ACK
INDICATOR, BSRP, AND/OR RETRY INDICATOR AND RESPOND/
PROCESS INDICATOR ACCORDINGLY

502

UPON RECEIVING, FROM AP, DL MU DATA FRAME THAT
INCLUDES EMBEDDED TRIGGER, TRANSMIT UL DATA SEGMENT
TO AP RESPONSIVE TO EMBEDDED TRIGGER

602　FT = TRIGGER

604　STA LIST

606　RU LIST

608　INDICATORS: NO-ACK, NEW SEGMENT, RETRY WITH TARGET STA, BSRP

COMPACT MULTI-USER MIMO SCHEDULING METHOD

TECHNICAL FIELD

The present disclosure relates generally to multi-user transmission schemes for a network.

BACKGROUND

Various IEEE 802.11 standards define downlink (DL) and uplink (UL) multi-user (MU) communication structures or transmission schemes. For example, IEEE 802.11ax defines an MU trigger, and 802.11be improves on the trigger and trigger response structures. However, the triggers include a stepwise process that involves transmission of separate overhead frames. The overhead frames may carry redundant or known information and may be unnecessary. The transmission of the overhead frames introduces time and bandwidth inefficiency in the DL and UL MU transmission schemes.

BRIEF DESCRIPTION OF THE DRAWINGS

FIG. 4 is a flowchart of a method of performing MU transmission schemes, including the UL MU transmission scheme and the interleaved MU transmission scheme, according to an example embodiment.

FIG. 5 is a flowchart of another method of performing MU transmission schemes, according to an example embodiment.

DETAILED DESCRIPTION

Overview

In an embodiment, a method is performed by an access point configured to communicate wirelessly with wireless stations. The method comprises: transmitting, to the wireless stations, a first multi-user trigger frame that identifies the wireless stations and allocates, to the wireless stations, resource units in which the wireless stations are to transmit data; and responsive to transmitting the first multi-user trigger frame, receiving, from the wireless stations, an uplink multi-user data frame that includes uplink data segments concurrently transmitted in the resource units by at least some of the wireless stations.

Example Embodiments

Figure 1:
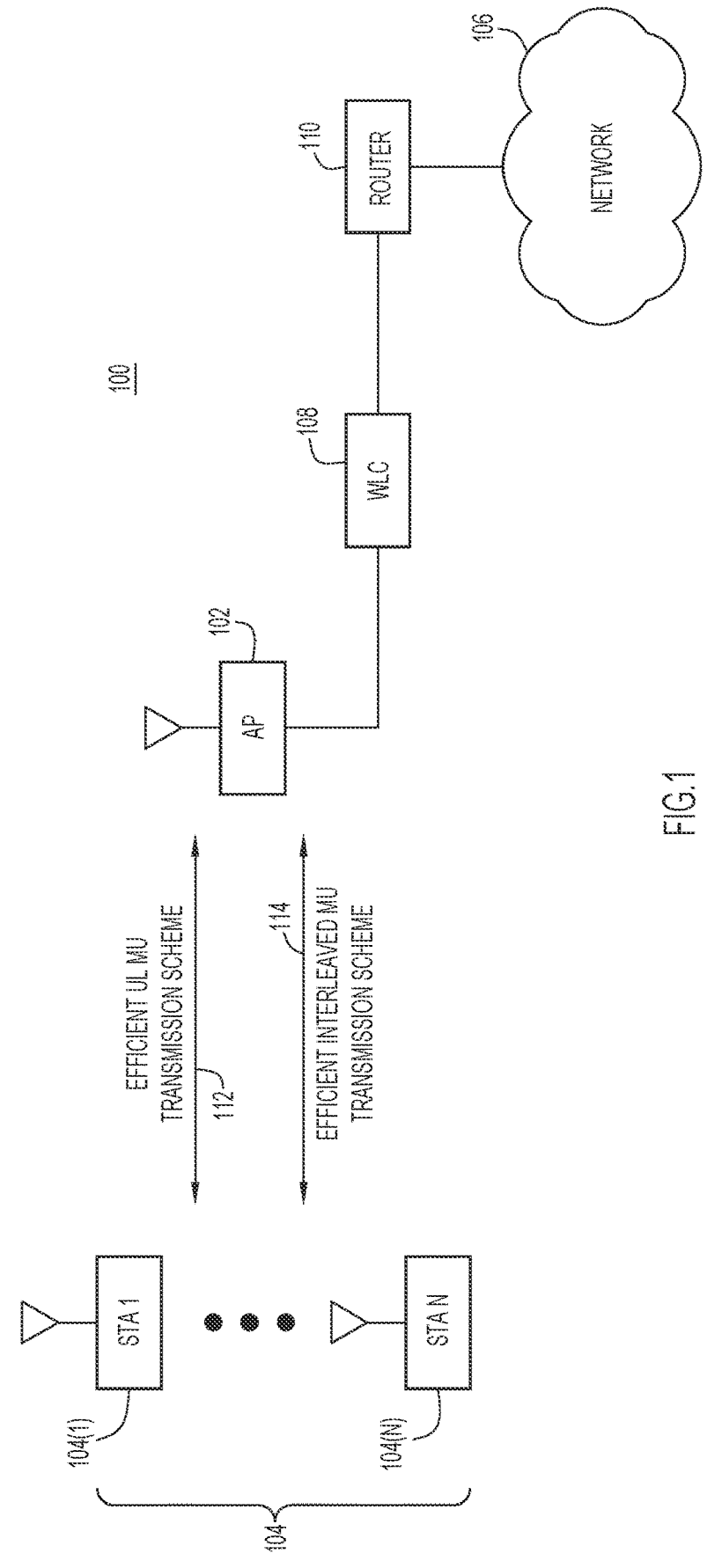
FIG. 1 is a block diagram of a network in which embodiments directed to efficient multi-user (MU) transmission schemes may be implemented, according to an example embodiment.

FIG. 1 is a block diagram of an example network 100 in which embodiments directed to efficient multi-user (MU) transmission schemes may be implemented. Network 100 includes a wireless access point (AP) 102 configured to communicate wirelessly with a group of client devices or wireless stations (STAs) (104(1)-104(N)) (collectively referred to as "STAs 104"). AP 102 may communicate with a network 106 through one or more of a wireless local area network (LAN) controller (WLC) 108 and/or a router 110, for example. Network 106 may include one or more LANs and one or more wide area networks (WANs), such as the Internet. In the example of FIG. 1, a wireless transmission from AP 102 to one or more of STAs 104 is referred to as a downlink (DL) transmission. A transmission from one or more of STAs 104 to AP 102 is referred to as an uplink (UL) transmission.

According to the embodiments presented herein, AP 102 and the STAs 104 implement an efficient UL MU transmission scheme 112 by which AP 102 solicits data (e.g., network traffic) intended for network 106 from STAs 104, which then send their data to the AP. That is, efficient UL MU transmission scheme 112 results in data flowing from STAs 104 to AP 102 in an uplink direction. Additionally, AP 102 and STAs 104 implement an efficient interleaved MU transmission scheme 114 by which the AP sends data from network 106 to the STAs and vice-versa. Both efficient MU transmission schemes may be implemented in the context of MU-multiple-input-multiple-output (MIMO) (MU-MIMO). That is, the efficient MU transmission schemes may be implemented as MU-MIMO transmission schemes. Moreover, the efficient MU transmission schemes may be implemented in accordance with the IEEE 802.11 standards modified or extended to include the new features presented herein. For example, AP 102 and STAs 104 may each be configured to operate in accordance with one or more IEEE 802.11 standards directed to MU/MU-MIMO transmission schemes, modified as described herein.

A brief description of conventional UL and DL MU transmission schemes is provided to help highlight efficiencies and advantages afforded by the embodiments presented herein. A conventional DL MU transmission scheme includes sequential phases. First, an AP (e.g., AP 102) sends an MU request-to-send (RTS) to a group of STAs (e.g., STAs 104). The RTS indicates for each target STA the resource unit(s) (RU(s)) (i.e., "announced RU(s)") the AP is going to use to transmit data. The goal of the RTS is to verify that all intended recipients have a clear 20/40/80/160/320 MHz channel, for example. Second, all of the target STAs respond in parallel in an MU response, indicating clear-to-send (CTS) for their 20/40/80/160/320 MHz channels. Third, the AP sends a DL MU data frame with data segments in the announced RU targeted to each STA. Fourth, after the transmission completes, the AP sends a block acknowledgement (ACK) request (BAR) to confirm that each STA received the transmission successfully. If the data frames were received successfully, the STAs respond with a block ACK in parallel. The aforementioned RTS, CTS, and ACKs are separate "overhead" frames or transmissions.

Like the conventional DL MU transmission scheme, a conventional UL MU transmission scheme includes sequential phases. Initially, the AP obtains buffer status reports (BSRs) for all STAs. The BSR can be sent individually by each STA with a single user (SU) frame (but such frame consumes the entire channel). To solicit the BSRs, the AP can send a request to the STAs using a BSR poll (BSRP)

frame, which also allocates to each STA an RU in which to return a BSR. All STAs respond in parallel in an UL MU BSR response. The AP then knows which STA has which traffic to send. Then, the AP sends an MU RTS to all STAs, with an allocation of RUs for data transmission by the STAs. All STAs respond in parallel in an MU response, indicating CTS to acknowledge the allocated upstream RUs. The AP then sends a trigger frame to start each STA transmission. All targeted STAs respond in parallel with data in their respective RUs. If the data frames were received successfully by the AP, the AP responds with a group block ACK. The aforementioned BSRP, BSRs, RTS, CTS, and ACK generally represent separate overhead frames.

The use of separate overhead frames in the conventional DL and UL MU transmission schemes adds complexity and can be inefficient from both time and transmission bandwidth perspectives. Therefore, the efficient MU transmission schemes presented herein advantageously reduce or eliminate the above-mentioned overhead frames. To this end, the efficient MU transmission schemes introduce an enhanced trigger frame that incorporates new functionality, some of which is provided by the separate overhead frames, and some of which is new. In other words, in part, the efficient MU transmission schemes modify the conventional trigger frame to add functionality to the trigger frame.

Figure 2:
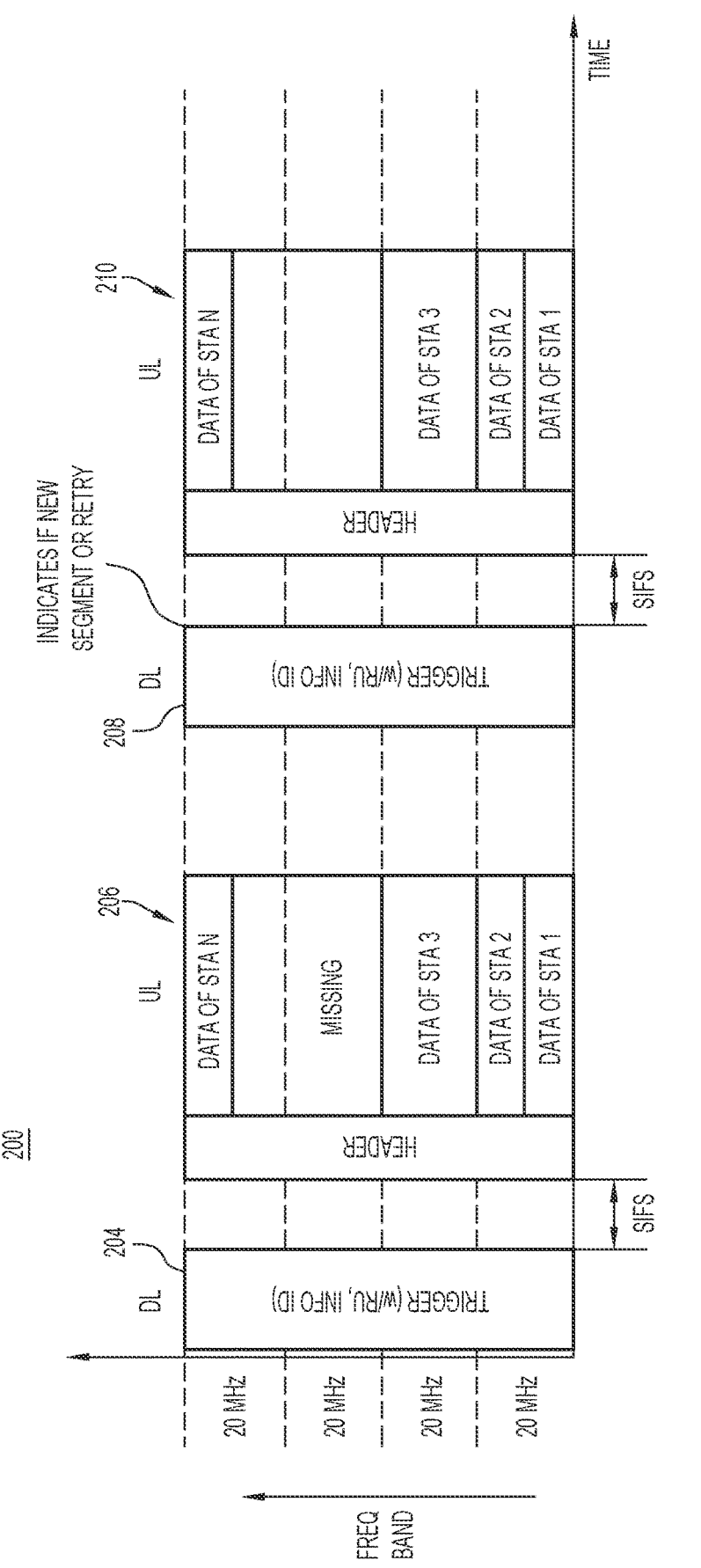
FIG. 2 is an illustration of an MU frame exchange between a wireless access point (AP) and wireless stations (STAs) of the network used to implement an efficient uplink (UL) MU transmission scheme, according to an example embodiment.

FIG. 2 is an illustration of an example MU frame exchange 200 between AP 102 and STAs 104 used to implement efficient UL MU transmission scheme 112, by which the AP solicits data from STAs 104. In FIG. 2, "DL" denotes a DL MU transmission and "UL" denotes an UL MU transmission. Efficient UL MU transmission scheme 112 skips or drops the separate BSRP, BSRs, RTS, CTS, and ACK frames of the conventional UL MU transmission scheme. Before efficient UL MU transmission scheme 112 begins, AP 102 determines RUs for STAs 104. An RU is a group of orthogonal frequency division multiplexing (OFDM) subcarriers present in an OFDM transmission. AP 102 may employ a known sounding technique (referred to simply as "sounding") to determine which STAs 104 can transmit on which RUs. Armed with this information, AP 102 moves to efficient UL MU transmission scheme 112, described below.

Initially, AP 102 originates a DL MU transmission that includes a trigger frame 204 (e.g., a first trigger frame). AP 102 does not transmit any of the aforementioned overhead frames prior to trigger frame 204. That is, efficient UL MU transmission scheme 112 begins with trigger frame 204, directly. Trigger frame 204 lists STAs 104 ("info ID") targeted by the trigger frame, and allocates to the STAs respective RUs to be used by the STAs to transmit data to AP 102. That is, trigger frame 204 identifies STAs 104 and allocates a respective RU to each STA, i.e., indicates an RU for each STA. Additionally, trigger frame 204 may indicate uplink orthogonal frequency division multiple random access (UORA) (as defined by IEEE 802.11ax, for example), for uplink unscheduled transmissions.

AP 102 expects to receive data segments from the targeted STAs. Responsive to trigger frame 204, and after a short interframe space (SIFS), STAs 104 concurrently transmit to AP 102 (and AP 102 receives) an MU data frame 206. MU data frame 206 includes a data frame header (referred to simply as a "header") followed by concurrent data segments transmitted by STAs 104, identified as "Data of STA 1" (e.g., STA 104(1)), "Data of STA 2" (e.g., STA 104(2)), and so on. Additionally, STAs 104 may include ACKs with their data segments, but have the option of signaling that no ACK will be sent, i.e., signaling "no-ACK." In an embodiment, trigger frame 204 may specify or include a no-ACK indicator to indicate that no ACK is to be delivered by STAs 104 in their UL MU transmissions. In that case, trigger frame 204 includes the list of STAs, the allocation of RUs to the STAs, and the no-ACK indicator. The STAs that receive trigger frame 204 with the no-ACK indicator will not send ACKs. That is, the no-ACK indicator causes STAs 104 to suppress transmitting ACKs.

AP 102 receives MU data frame 206 and determines whether it includes data segments from all STAs 104 as expected, i.e., the AP determines which expected data segments were received successfully and which (if any) were not received successfully (i.e., are missing). In the example of FIG. 2, several of STAs 104 (e.g., STA 104(4)) (referred to as "non-responsive" STAs) did not send their data segments. Thus, AP 102 determines that several of the expected data segments were not received successfully from non-responsive STAs. AP 102 also determines which of STAs 104 are the non-responsive STAs.

Responsive to these determinations, AP 102 originates another DL MU transmission that includes a trigger frame 208 (e.g., a second trigger frame) similar to trigger frame 204, except that trigger frame 208 includes a re-transmission or retry indicator/flag targeted to each non-responsive STA (i.e., the retry indicator is selectively associated with a STA identifier for the non-responsive STA), which solicits the missing data segment from each non-responsive STA. The retry indicator indicates to each non-responsive STA to transmit a prior data segment available in a data cache of the STA. Trigger frame 208 may also allocate to each non-responsive STA a larger RU than was previously allocated to the STA, in case the reason the STA was non-responsive was that the previously allocated RU was too small to accommodate the available data segment. Trigger frame 208 may also include a new data segment indicator targeted to each of the responsive STAs of STAs 104 that actually sent data segments in MU data frame 206 and that have more data to send. Thus, trigger frame 208 may include a mix of retry indicators for the non-responsive STAs and new segment indicators for the responsive STAs.

Responsive to trigger frame 208, and after an SIFS, STAs 104 transmit MU data frame 210 including a header and respective UL data segments. The non-responsive STAs transmit previous data segments, while the responsive STAs transmit new data segments.

In another embodiment, one or more of trigger frames 204 and 208 may also include or incorporate a BSRP that targets STAs 104. The BSRP is encoded into a field of the trigger frame, and therefore does not constitute a separate DL MU frame. Responsive to the BSRP encoded into the trigger frame, STAs 104 transmit respective BSRs. In one example, STAs 104 transmit respective data segments followed by the respective BSRs. In another example, STAs 104 insert respective BSRs into the MU data frame (e.g., after the header or before a frame check sequence (FCS)). Alternatively, STAs 104 may transmit respective BSRs after the data frame and one SIFS, for example.

In summary, efficient UL MU transmission scheme 112 limits non-data overhead by removing the conventional sequential trigger phase, and replacing it with a direct transmission trigger frame.

Figure 3:
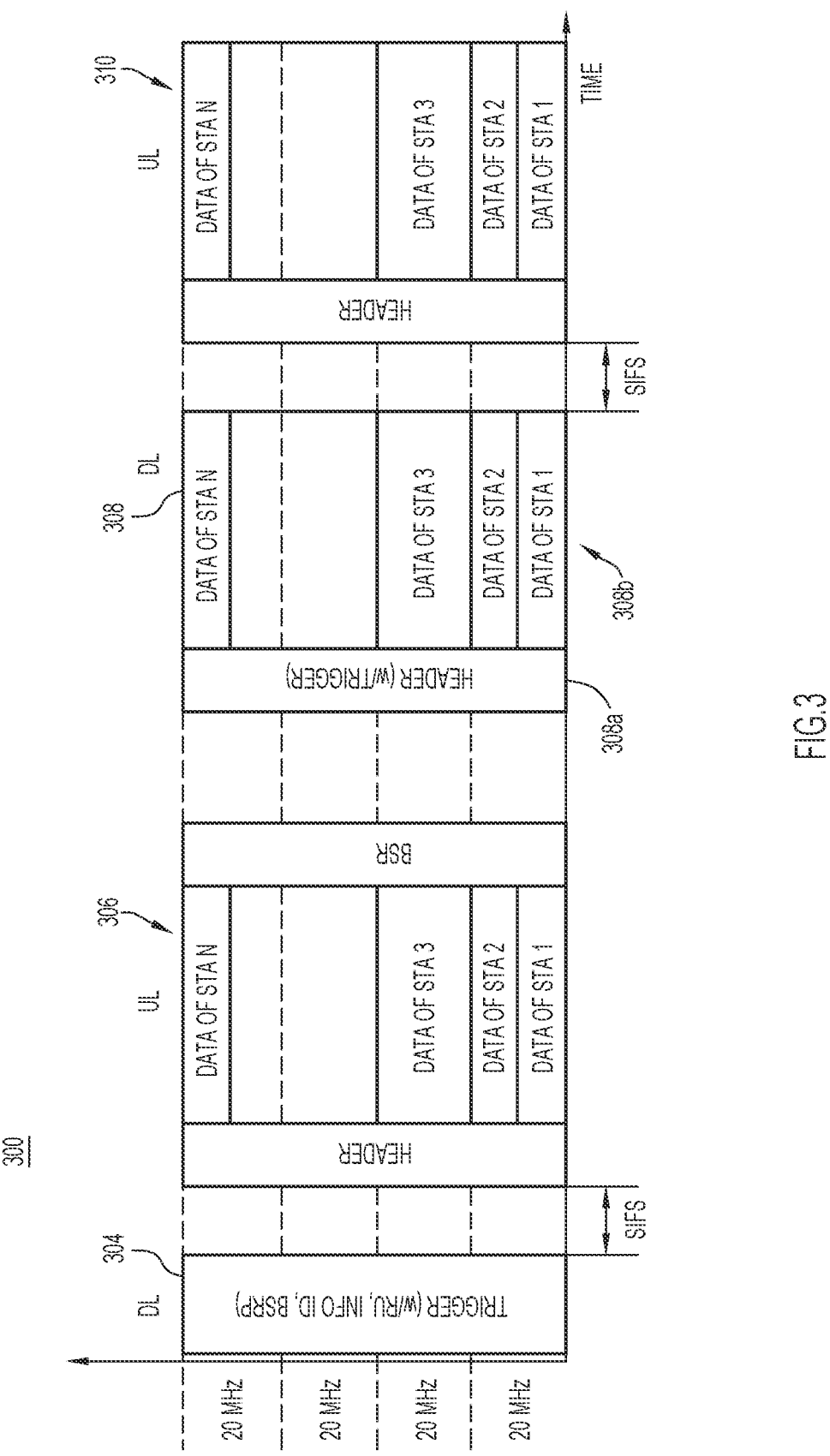
FIG. 3 is an illustration of an MU frame exchange between the AP and the STAs used to implement an efficient interleaved MU transmission scheme, according to an example embodiment.

FIG. 3 is an illustration of an example MU frame exchange 300 between AP 102 and STAs 104 used to implement efficient interleaved MU transmission scheme 114 (also referred to as an "efficient UL-DL MU transmission scheme"), by which the AP solicits data from STAs 104, and sends data to the STAs. MU frame exchange 300 begins with a DL MU transmission of a trigger frame 304 from AP 102 to STAs 104 to trigger the STAs to send data to the AP. Trigger frame 304 lists STAs 104, allocates respective RUs to the STAs, and includes an embedded BSRP targeting the STAs.

In response to trigger frame 304, and after an SIFS, STAs 104 concurrently transmit MU data frame 306. MU data frame 306 includes respective concurrent data segments from STAs 104, and terminates with a block BSR that indicates to AP 102 that STAs 104 have more data to send. In the example of FIG. 3, AP 102 also has data to send to STAs 104. Accordingly, AP 102 originates a next DL MU transmission that includes an MU data frame 308. MU data frame 308 includes a header 308a followed by concurrent data segments 308b intended for/targeted to respective ones of STAs 104, as shown. In response to the preceding BSR from STAs 104, AP 102 embeds in header 308a a trigger targeting STAs 104, and also indicates in the header respective RU allocations to the STAs. Thus, the (DL) MU transmission of MU data frame 308 sends data from AP 102 to STAs 104 with the embedded trigger to trigger the STAs to transmit their data.

Responsive to the trigger in MU data frame 308, and following an SIFS, STAs 104 originate an UL MU transmission including a data frame 310 that carries concurrent respective UL data segments from STAs 104, as shown. In summary, when AP 102 transmits MU data frame 308 to STAs 104 and intends to schedule an UL MU transmission for that same set of STAs, the MU data frame includes a trigger for the subsequent UL MU transmission, forming an interleaved trigger structure, and thus allowing the receiving STAs to prepare their transmitters for transmission in allocated RUs. In an embodiment, the trigger information is inserted in the DL MU data frame. In another embodiment, an DL MU duration field accounts for the DL MU data frame, an SIFS, and the following trigger frame. In that case, the trigger frame is sent after the DL MU data frame and an SIFS.

FIG. 4 is a flowchart of an example method 400 of performing MU transmission schemes, including an UL MU transmission scheme and an interleaved MU transmission scheme. Method 400 may be performed by an AP (e.g., AP 102) configured to communicate wirelessly with a group or set of STAs (e.g., STAs 104). The AP and STAs may perform the MU transmission schemes generally in accordance with one or more IEEE 802.11 standards, for example, modified or extended to support functions/operations described herein. The MU transmission schemes may be performed in the context of MU-MIMO, for example.

At 402, the AP transmits, to the STAs, a first MU trigger frame that identifies the STAs and allocates to the STAs RUs in which the STAs are to transmit data. The AP waits for, and expects to receive, data from each of the STAs. Prior to transmitting the first MU trigger frame, the AP skips exchanging, with the STAs, one or more, or all, separate MU overhead frames including a CTS frame, an RTS frame, and a BSRP frame, for example.

Responsive to transmitting the first MU trigger frame, at 404, the AP receives, from the STAs, an MU data frame that includes UL data segments concurrently transmitted in the allocated RUs by at least some of the STAs.

After receiving the MU data frame, at 406, upon determining that an UL data segment of the UL data segments expected to be received from the STAs was not received successfully, the AP identifies a non-responsive STA among the STAs that failed to transmit the UL data segment. The AP may also identify responsive STAs among the STAs from which UL data segments were received successfully.

At 408, the AP transmits a second MU trigger frame that identifies the STAs and allocates RUs to the STAs similarly to the first MU trigger frame, except for the following differences. The second MU trigger frame includes a retry indicator targeting the non-responsive STA and configured to cause the non-responsive STA to retransmit its prior UL data segment. Additionally, the second MU trigger frame may allocate to the non-responsive STA a larger RU than was previously allocated to the non-responsive STA in the first MU trigger frame. Additionally, the second MU trigger frame may include new segment indicators targeted to the responsive STAs that have more data to send.

At 410, the AP transmits a DL MU data frame having a header and DL data segments targeting the STAs. The header includes a trigger encoded or embedded in the header and configured to cause the STAs to transmit data to the AP. Responsive to transmitting the embedded trigger, the AP receives an UL MU data frame transmitted by the STAs.

In an embodiment, the first MU trigger frame may include a no-ACK indicator configured to cause the STAs to suppress sending ACKs. In another embodiment, the first MU trigger frame may include a BSRP configured to cause the STAs to respond with respective BSRs so that the AP can learn which of the STAs have additional data to send.

FIG. 5 is a flowchart of another example method 500 of performing MU transmission schemes. Method 500 may be performed by a STA among a group of STAs that communicate wirelessly with an AP.

At 502, the STA receives a DL MU trigger frame that identifies the STAs (including the STA) and allocates to the STAs (including the STA) RUs in which the STAs are to transmit data. Responsive to receiving the DL MU trigger frame, the STA transmits an UL data segment in an UL MU data frame. The STA determines whether the DL MU trigger frame includes any of a no-ACK indicator, a BSRP, or a retry indicator. When the DL MU trigger frame includes a no-ACK indicator, the STA suppresses sending an ACK. When the DL MU trigger frame does not include the no-ACK indicator, the STA optionally sends the ACK. When the DL MU trigger fame includes a BSRP, the STA transmits a BSR with the UL data segment. When the DL MU trigger frame includes a retry indicator, the STA transmits a previous data segment as the UL data segment.

At 504, the STA receives a DL MU data frame transmitted by the AP. The STA recovers from the DL MU data frame a DL data segment targeted to the STA. When the DL MU data fame includes an embedded trigger targeting the STA, in response, the STA transmits an UL data segment to the AP responsive to the trigger.

Figure 6:
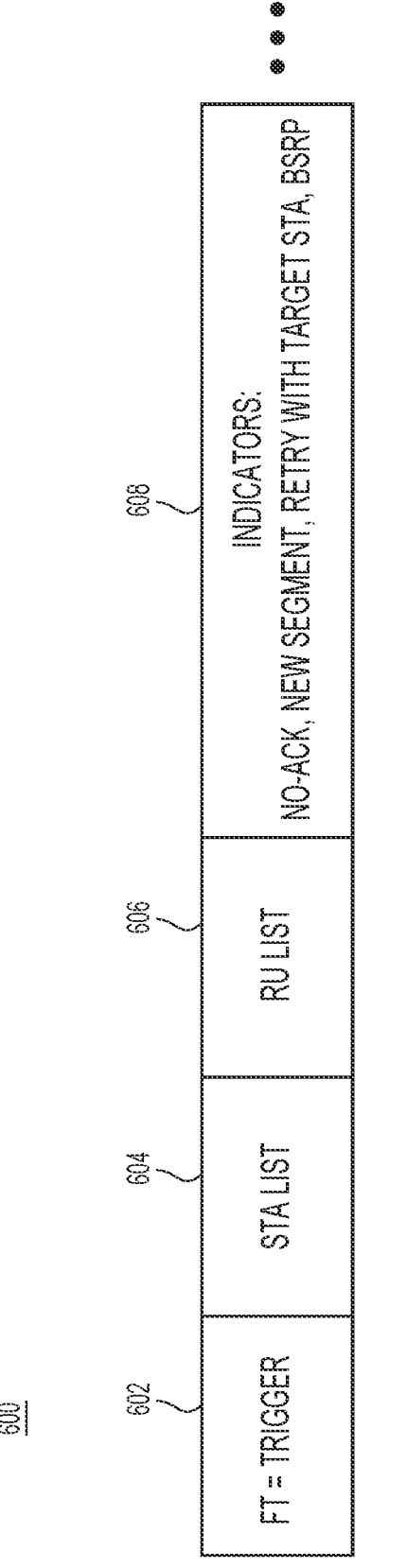
FIG. 6 is an illustration of a trigger frame, according to an example embodiment.

FIG. 6 is an illustration of an example trigger frame 600. In an example, trigger frame 600 may be formatted generally in accordance with the IEEE 802.11 standards, but modified to include various fields described herein. Trigger frame 600 may include more or less fields than are shown in FIG. 6. Trigger frame 600 includes a frame type (FT) 602 set to a value to indicate "trigger frame," a STA list 604 that includes identifiers (e.g., Internet Protocol (IP) addresses, media access control (MAC) addresses, and the like) of the STAs targeted by the trigger frame, an RU list 606 that lists RUs and their allocations to the STAs in the STA list, and indicators 608 that optionally include a retry indicator and identifier of a STA targeted by the retry indicator, a new segment identifier, a no-ACK indicator, and a BSRP.

Figure 7:
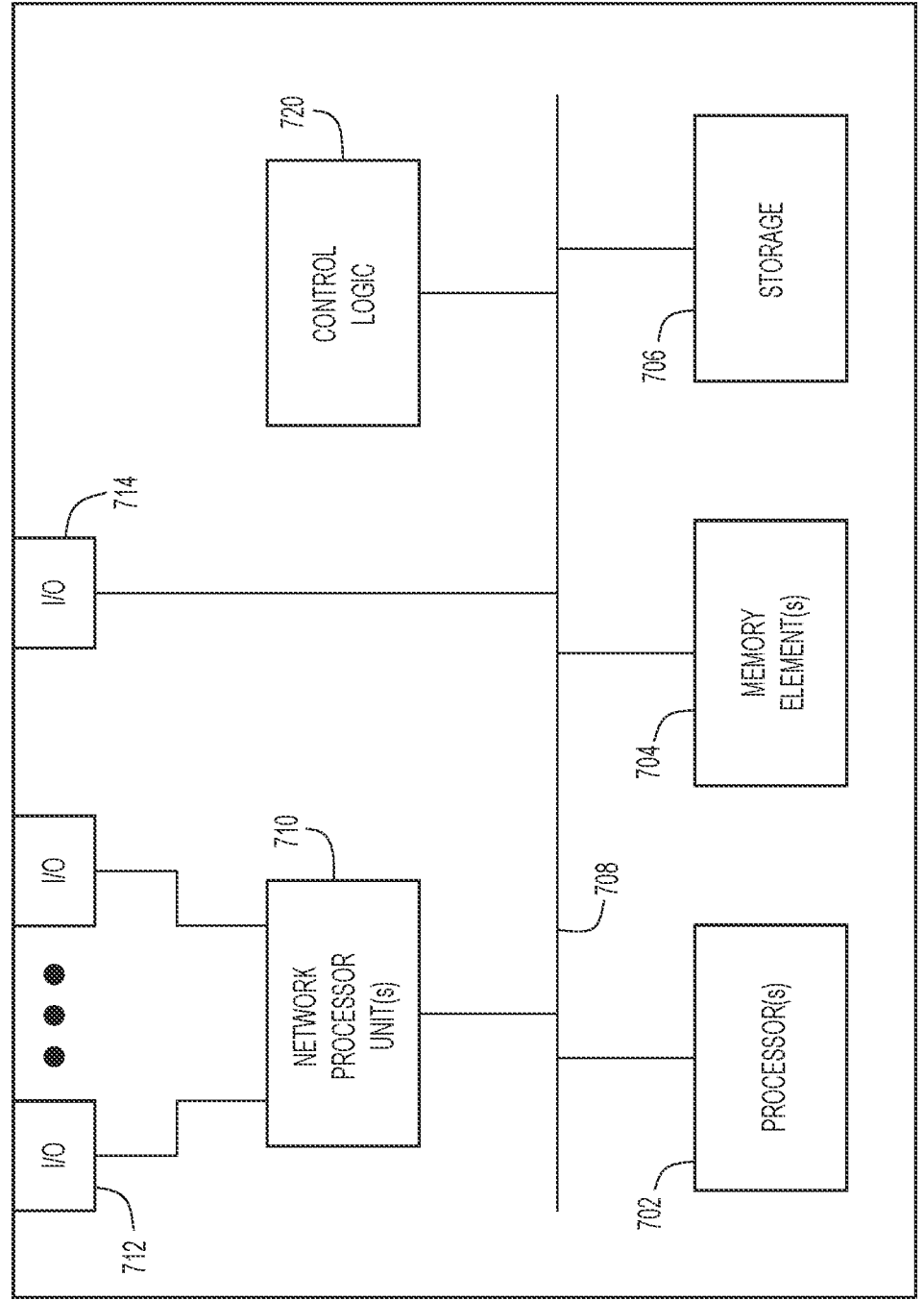
FIG. 7 illustrates a hardware block diagram of a computing device that may perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any entity/entities as discussed for the techniques depicted in connection with FIGS. 1-6 in order to perform operations of the various techniques discussed herein. For example, computing device 700 may represent AP 102 and/or a STA 102 (*i*).

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: at an access point configured to communicate wirelessly with wireless stations: transmitting, to the wireless stations, a first multi-user trigger frame that identifies the wireless stations and allocates, to the wireless stations, resource units in which the wireless stations are to transmit data; and responsive to transmitting the first multi-user trigger frame, receiving, from the wireless stations, an uplink multi-user data frame that includes uplink data segments concurrently transmitted in the resource units by at least some of the wireless stations.

In some aspects, the techniques described herein relate to a method, further including, at the access point: prior to transmitting the first multi-user trigger frame, skipping exchanging, with the wireless stations, separate overhead frames including a clear-to-send frame, a request-to-send frame, and a buffer status report poll (BSRP) frame.

In some aspects, the techniques described herein relate to a method, further including, at the access point, after receiving: upon determining that an uplink data segment of the uplink data segments was not received, identifying a non-responsive wireless station among the wireless stations from which the uplink data segment was not received; and transmitting a second multi-user trigger frame that includes a retry indicator configured to cause the non-responsive wireless station to retransmit the uplink data segment that was not received.

In some aspects, the techniques described herein relate to a method, wherein: the second multi-user trigger frame allocates a larger resource unit to the non-responsive wireless station than was previously allocated in the first multi-user trigger frame.

In some aspects, the techniques described herein relate to a method, wherein: transmitting the first multi-user trigger frame includes transmitting the first multi-user trigger frame to include a no-acknowledgement indicator configured to cause the wireless stations to suppress transmitting acknowledgments.

In some aspects, the techniques described herein relate to a method, wherein: transmitting the first multi-user trigger frame includes transmitting the first multi-user trigger frame encoded with a buffer status report poll (BSRP) targeting the wireless stations; and the method further includes, responsive to transmitting the BSRP, receiving, from the wireless stations, buffer status reports that indicate whether the wireless stations have data to send.

In some aspects, the techniques described herein relate to a method, wherein: receiving, from the wireless stations, the buffer status reports includes receiving the buffer status reports in a header of the uplink multi-user data frame.

In some aspects, the techniques described herein relate to a method, further including, at the access point: transmitting a downlink multi-user data frame having a data frame header and downlink data segments targeting the wireless stations, wherein the data frame header includes a trigger configured to cause the wireless stations to transmit data to the access point.

In some aspects, the techniques described herein relate to a method, wherein: the access point and the wireless stations each operate in accordance with one or more IEEE 802.11 standards directed to multi-user transmission.

In some aspects, the techniques described herein relate to an apparatus including: a network processing unit to communicate over one or more networks; and a processor coupled to the network processing unit and configured to perform: transmitting, to wireless stations, a first multi-user trigger frame that identifies the wireless stations and allocates, to the wireless stations, resource units in which the wireless stations are to transmit data; and responsive to transmitting the first multi-user trigger frame, receiving, from the wireless stations, an uplink multi-user data frame that includes uplink data segments concurrently transmitted in the resource units by at least some of the wireless stations.

In some aspects, the techniques described herein relate to an apparatus, wherein the processor is further configured to perform: prior to transmitting the first multi-user trigger frame, skipping exchanging, with the wireless stations, separate overhead frames including a clear-to-send frame, a request-to-send frame, and a buffer status report poll (BSRP) frame.

In some aspects, the techniques described herein relate to an apparatus, wherein the processor is further configured to perform, after receiving: upon determining that an uplink data segment of the uplink data segments was not received, identifying a non-responsive wireless station among the wireless stations from which the uplink data segment was not received; and transmitting a second multi-user trigger frame that includes a retry indicator configured to cause the non-responsive wireless station to retransmit the uplink data segment that was not received.

In some aspects, the techniques described herein relate to an apparatus, wherein: the second multi-user trigger frame allocates a larger resource unit to the non-responsive wireless station than was previously allocated in the first multi-user trigger frame.

In some aspects, the techniques described herein relate to an apparatus, wherein: the processor is configured to perform transmitting the first multi-user trigger frame by transmitting the first multi-user trigger frame to include a no-acknowledgement indicator configured to cause the wireless stations to suppress transmitting acknowledgments.

In some aspects, the techniques described herein relate to an apparatus, wherein: the processor is configured to perform transmitting the first multi-user trigger frame by transmitting the first multi-user trigger frame encoded with a buffer status report poll (BSRP) targeting the wireless stations; and the processor is further configured to perform, responsive to transmitting the BSRP, receiving, from the wireless stations, buffer status reports (BSRs) that indicate whether the wireless stations have data to send.

In some aspects, the techniques described herein relate to an apparatus, wherein: the buffer status reports are included in a header of the uplink multi-user data frame.

In some aspects, the techniques described herein relate to an apparatus, wherein the processor is further configured to perform: transmitting a downlink multi-user data frame having a data frame header and downlink data segments targeting the wireless stations, wherein the data frame header includes a trigger configured to cause the wireless stations to transmit data.

In some aspects, the techniques described herein relate to a non-transitory computer readable medium encoded with instructions that, when executed by a processor of an access point configured to communicate wirelessly with wireless stations, cause the processor to perform: transmitting, to the wireless stations, a first multi-user trigger frame that identifies the wireless stations and allocates, to the wireless stations, resource units in which the wireless stations are to transmit data; and responsive to transmitting the first multi-user trigger frame, receiving, from the wireless stations, an uplink multi-user data frame that includes uplink data segments concurrently transmitted in the resource units by at least some of the wireless stations.

In some aspects, the techniques described herein relate to a non-transitory computer readable medium, further including instructions to cause the processor to perform: prior to transmitting the first multi-user trigger frame, skipping exchanging, with the wireless stations, separate overhead frames including a clear-to-send frame, a request-to-send frame, and a buffer status report poll (BSRP) frame.

In some aspects, the techniques described herein relate to a non-transitory computer readable medium, further including instructions to cause the processor to perform, after receiving: upon determining that an uplink data segment of the uplink data segments was not received, identifying a non-responsive wireless station among the wireless stations from which the uplink data segment was not received; and transmitting a second multi-user trigger frame that includes a retry indicator configured to cause the non-responsive wireless station to retransmit the uplink data segment that was not received.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

at an access point configured to communicate wirelessly with wireless stations:

prior to transmitting a first multi-user trigger frame, skipping transmitting to the wireless stations, a separate buffer status report poll (BSRP) frame;

transmitting, to the wireless stations, the first multi-user trigger frame that identifies the wireless stations and allocates, to the wireless stations, resource units in which the wireless stations are to transmit data, wherein the first multi-user trigger frame is encoded with a buffer status report poll (BSRP) targeting the wireless stations;

responsive to transmitting the first multi-user trigger frame, receiving, from each of some of the wireless stations, an uplink multi-user data frame that includes uplink data segments concurrently transmitted in the resource units;

responsive to transmitting the BSRP, receiving, from the wireless stations, buffer status reports (BSRs) that indicate whether the wireless stations have data to send;

based on the first multi-user trigger frame and the BSRs, determining a responsive wireless station from which expected data segments were received and with more data segments to send, and a non-responsive wireless station from which an expected data segment was not received; and transmitting a second multi-user trigger frame including a new data segment indicator targeting the responsive wireless station to solicit a new data segment, and a retry indicator targeting the non-responsive wireless station to solicit a retransmission of a prior data segment.

2. The method of claim 1, further comprising, at the access point:

prior to transmitting the first multi-user trigger frame, skipping exchanging, with the wireless stations, separate overhead frames including a clear-to-send frame and a request-to-send frame.

3. The method of claim 1, further comprising, at the access point, after wherein:

the retry indicator is selectively associated with a wireless station identifier for the non-responsive wireless station.

4. The method of claim 1, wherein:

the second multi-user trigger frame is configured to allocate a larger resource unit to the non-responsive wireless station than was previously allocated in the first multi-user trigger frame.

5. The method of claim 1, wherein:
transmitting the first multi-user trigger frame includes
transmitting the first multi-user trigger frame to include
a no-acknowledgement indicator configured to cause
the wireless stations to suppress transmitting acknowl-
edgments.

6. The method of claim 1, wherein:
the first multi-user trigger frame includes a header that has
a trigger targeting the wireless stations, and wherein the
header indicates respective resource unit allocations to
the wireless stations.

7. The method of claim 6, wherein:
receiving, from the wireless stations, the buffer status
reports includes receiving the buffer status reports in a
data frame header of the uplink multi-user data frame.

8. The method of claim 1, further comprising, at the
access point:
transmitting a downlink multi-user data frame having a
data frame header and downlink data segments target-
ing the wireless stations, wherein the data frame header
includes a trigger configured to cause the wireless
stations to transmit data to the access point.

9. The method of claim 1, wherein:
the access point and the wireless stations each operate in
accordance with one or more IEEE 802.11 standards
directed to multi-user transmission.

10. An apparatus comprising:
a network processing unit to communicate over one or
more networks; and
a processor coupled to the network processing unit and
configured to perform:
    prior to transmitting a first multi-user trigger frame,
    skipping transmitting to wireless stations, a separate
    buffer status report poll (BSRP) frame;
    transmitting, to the wireless stations, the first multi-user
    trigger frame that identifies the wireless stations and
    allocates, to the wireless stations, resource units in
    which the wireless stations are to transmit data,
    wherein the first multi-user trigger frame is encoded
    with a buffer status report poll (BSRP) targeting the
    wireless stations;
    responsive to transmitting the first multi-user trigger
    frame, receiving, from the wireless stations, an
    uplink multi-user data frame that includes uplink
    data segments concurrently transmitted in the
    resource units; and
    responsive to transmitting the BSRP, receiving, from
    the wireless stations, buffer status reports (BSRs)
    that indicate whether the wireless stations have data
    to send;
    based on the first multi-user trigger frame and the
    BSRs, determining a responsive wireless station
    from which expected data segments were received
    and with more data segments to send, and a non-
    responsive wireless station from which an expected
    data segment was not received; and
    transmitting a second multi-user trigger frame includ-
    ing a new data segment indicator targeting the
    responsive wireless station to solicit a new data
    segment, and a retry indicator targeting the non-
    responsive wireless station to solicit a retransmission
    of a prior data segment.

11. The apparatus of claim 10, wherein the processor is
further configured to perform:
    prior to transmitting the first multi-user trigger frame,
    skipping exchanging, with the wireless stations, separate overhead frames including a clear-to-send frame
and a request-to-send frame.

12. The apparatus of claim 10, wherein:
the retry indicator is selectively associated with a wireless
station identifier for the non-responsive wireless sta-
tion.

13. The apparatus of claim 10, wherein:
the second multi-user trigger frame allocates a larger
resource unit to the non-responsive wireless station
than was previously allocated in the first multi-user
trigger frame.

14. The apparatus of claim 10, wherein:
the processor is configured to perform transmitting the
first multi-user trigger frame by transmitting the first
multi-user trigger frame to include a no-acknowledge-
ment indicator configured to cause the wireless stations
to suppress transmitting acknowledgments.

15. The apparatus of claim 10, wherein:
the first multi-user trigger frame includes a header that has
a trigger targeting the wireless stations, and wherein the
header indicates respective resource unit allocations to
the wireless stations.

16. The apparatus of claim 15, wherein:
the buffer status reports are included in a data frame
header of the uplink multi-user data frame.

17. The apparatus of claim 10, wherein the processor is
further configured to perform:
    transmitting a downlink multi-user data frame having a
    data frame header and downlink data segments target-
    ing the wireless stations, wherein the data frame header
    includes a trigger configured to cause the wireless
    stations to transmit data.

18. A non-transitory computer readable medium encoded
with instructions that, when executed by a processor of an
access point configured to communicate wirelessly with
wireless stations, cause the processor to perform:
    prior to transmitting a first multi-user trigger frame,
    skipping transmitting to the wireless stations, a separate
    buffer status report poll (BSRP) frame;
    transmitting, to the wireless stations, the first multi-user
    trigger frame that identifies the wireless stations and
    allocates, to the wireless stations, resource units in
    which the wireless stations are to transmit data,
    wherein the first multi-user trigger frame is encoded
    with a buffer status report poll (BSRP) targeting the
    wireless stations;
    responsive to transmitting the first multi-user trigger
    frame, receiving, from each of some of the wireless
    stations, an uplink multi-user data frame that includes
    uplink data segments concurrently transmitted in the
    resource units;
    responsive to transmitting the BSRP, receiving, from the
    wireless stations, buffer status reports (BSRs) that
    indicate whether the wireless stations have data to send;
    based on the first multi-user trigger frame and the BSRs,
    determining a responsive wireless station from which
    expected data segments were received and with more
    data segments to send, and a non-responsive wireless
    station from which an expected data segment was not
    received; and
    transmitting a second multi-user trigger frame including a
    new data segment indicator targeting the responsive
    wireless station to solicit a new data segment, and a
    retry indicator targeting the non-responsive wireless
    station to solicit a retransmission of a prior data seg-
    ment.

19. The non-transitory computer readable medium of claim 18, further comprising instructions to cause the processor to perform:

prior to transmitting the first multi-user trigger frame, skipping exchanging, with the wireless stations, separate overhead frames including a clear-to-send frame and a request-to-send frame.

20. The non-transitory computer readable medium of claim 18, wherein:

the retry indicator is selectively associated with a wireless station identifier for the non-responsive wireless station.

* * * * *